US010452719B2

(12) United States Patent
Choi et al.

(10) Patent No.: US 10,452,719 B2
(45) Date of Patent: Oct. 22, 2019

(54) TERMINAL APPARATUS AND METHOD FOR SEARCH CONTENTS

(71) Applicant: Samsung Electronics Co., Ltd., Suwon-si, Gyeonggi-do (KR)

(72) Inventors: Hyung-tak Choi, Suwon-si (KR); Sang-wook Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 14/963,697

(22) Filed: Dec. 9, 2015

(65) Prior Publication Data
US 2016/0171058 A1 Jun. 16, 2016

(30) Foreign Application Priority Data

Dec. 12, 2014 (KR) .................. 10-2014-0179179

(51) Int. Cl.
*G06F 17/30* (2006.01)
*G06F 16/903* (2019.01)
*G06F 16/9032* (2019.01)

(52) U.S. Cl.
CPC .... *G06F 16/90335* (2019.01); *G06F 16/9032* (2019.01)

(58) Field of Classification Search
CPC ......... G06F 17/30967; G06F 17/30554; G06F 17/30551; G06F 17/30401; G06F 17/30368; G06F 16/951; G06F 16/245; G06F 16/3329; G06F 16/248; G06F 16/36; G06F 16/332; G06F 16/738; G06F 16/90335; G06F 16/9032
See application file for complete search history.

(56) References Cited

U.S. PATENT DOCUMENTS

| 5,884,251 A * | 3/1999 | Kim ................ G10L 19/12 704/219 |
| 8,805,741 B2 * | 8/2014 | Laverdiere-Papineau .................. G06F 21/6218 705/51 |
| 9,582,542 B2 | 2/2017 | Choi et al. |
| 2007/0219752 A1 * | 9/2007 | Aoyama ............... G06Q 10/00 702/187 |

(Continued)

FOREIGN PATENT DOCUMENTS

KR 10-2014-0029741 A 3/2014
WO 2012/145158 A1 10/2012

OTHER PUBLICATIONS

European Examination Report dated Feb. 28, 2019, issued in European Application No. 15868345.8.

(Continued)

*Primary Examiner* — Daniel A Kuddus
(74) *Attorney, Agent, or Firm* — Jefferson IP Law, LLP

(57) ABSTRACT

A terminal apparatus is provided. The terminal apparatus includes an input unit configured to receive an input of a search word related to a content to be searched for, a search unit including a processor configured to search for a time range corresponding to the content using the input search word and pre-stored log information, and to search for log information within the searched time range, and a display unit configured to display information regarding a list of contents corresponding to the searched log information.

20 Claims, 15 Drawing Sheets

(56) References Cited

U.S. PATENT DOCUMENTS

| | | | | |
|---|---|---|---|---|
| 2008/0141573 A1* | 6/2008 | Gnesa | ............... | B42B 5/12 |
| | | | | 40/658 |
| 2008/0171573 A1* | 7/2008 | Eom | ............... | H04M 1/72572 |
| | | | | 455/556.2 |
| 2010/0010944 A1* | 1/2010 | Cheng | ............... | G06Q 10/06 |
| | | | | 706/12 |
| 2012/0150777 A1* | 6/2012 | Setoguchi | ............... | G06N 20/00 |
| | | | | 706/14 |
| 2012/0265764 A1* | 10/2012 | Agrawal | ............... | G06F 16/14 |
| | | | | 707/746 |
| 2013/0006974 A1* | 1/2013 | Agrawal | ............... | G06F 16/14 |
| | | | | 707/723 |
| 2013/0097560 A1* | 4/2013 | Park | ............... | G06F 3/0482 |
| | | | | 715/811 |
| 2013/0132854 A1* | 5/2013 | Raleigh | ............... | G06F 3/0482 |
| | | | | 715/738 |
| 2014/0067861 A1* | 3/2014 | Choi | ............... | G06F 16/9535 |
| | | | | 707/772 |
| 2014/0093175 A1 | 4/2014 | Morimoto et al. | | |
| 2016/0027175 A1* | 1/2016 | Kim | ............... | G06T 7/0016 |
| | | | | 382/131 |

OTHER PUBLICATIONS

Korean Office Action dated Jan. 21, 2019, issued in Korean Application No. 10-2014-0179179.

* cited by examiner

TERMINAL APPARATUS AND METHOD FOR SEARCH CONTENTS

CROSS-REFERENCE TO RELATED APPLICATION(S)

This application claims the benefit under 35 U.S.C. § 119(a) of a Korean patent application filed on Dec. 12, 2014 in the Korean Intellectual Property Office and assigned Serial number 10-2014-0179179, the entire disclosure of which is hereby incorporated by reference.

TECHNICAL FIELD

The present disclosure relates to a terminal apparatus and a method for searching for contents. More particularly, the present disclosure relates to a terminal apparatus capable of searching for a content through an action related to the content in terms of time, and a content searching method thereof.

BACKGROUND

A terminal apparatus is an apparatus that may be connected to the internet using a communication network and that is configured to provide various contents to a user through the network. Today's terminal apparatuses may be installed in various applications, and users may see or create various types of contents using terminal apparatuses.

In order to search for a content stored in a terminal apparatus, a user must know the title of the content or the location where the content is stored. However, if the user doesn't know the title of the content or the location where the content is stored, it is not easy to search for the content in a conventional terminal apparatus. More specifically, if the user doesn't know the title of the content or the location where the content is stored, the user has to bear the inconvenience of checking each and every content stored.

However, sometimes a user may remember a certain thing based on an action. Therefore, even when the user cannot remember the title or the location where the content is stored, there are cases where the user remembers an action that he/she conducted during a viewing or a capturing of the content, an executing of the content, and/or a creating of the content. For example, supposing a user made a telephone call with another user A after writing a certain memo, the user may not remember the title of the memo but may remember that he/she made a telephone call with user A at the point of creating that memo.

However, conventional terminal apparatuses do not provide a method for searching a certain content based on a telephone call-based action of the user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal apparatus capable of searching for content through an action related to the content in terms of time, and a content searching method thereof.

In accordance with an aspect of the present disclosure, a terminal apparatus is provided. The terminal apparatus includes an input unit configured to receive an input of a search word related to a content to be searched for, a search unit configured to search for a time range corresponding to the content using the input search word and pre-stored log information, and to search for log information within the searched time range, and a display unit configured to display information regarding a list of contents corresponding to the searched log information.

In accordance with another aspect of the present disclosure, a method for searching for contents on a terminal apparatus is provided. The method includes receiving, by an input unit of the terminal apparatus, an input of a keyword related to a content to be searched, searching for a time range corresponding to the content using the input search word and pre-stored log information, searching for log information within the searched time range, and displaying information regarding a list of contents corresponding to the searched log information.

In accordance with another aspect of the present disclosure, a non-transitory computer-readable storage medium storing instructions is provided. The instructions, when executed, causing at least one processor to perform a method for searching contents, the method including receiving input of a keyword related to a content to be searched, searching for a time range corresponding to the content using the input search word and pre-stored log information, searching log information within the searched time range, and displaying information regarding a list of contents corresponding to the searched log information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
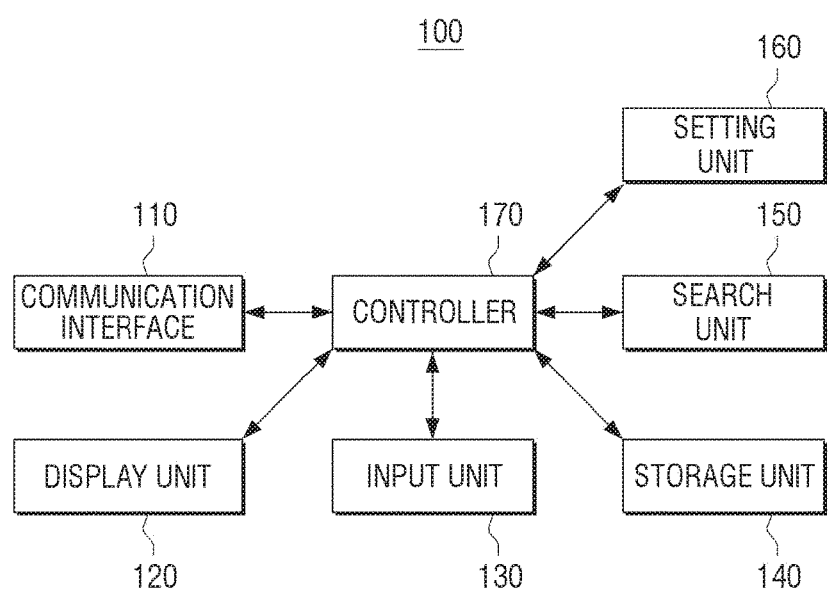
FIG. 1 is a block diagram illustrating a configuration of a terminal apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, like drawing reference numerals are used for the like elements, even in different drawings. The matters defined in the description, such as detailed construction and elements, are provided to assist in a comprehensive understanding of various embodiments. However, various embodiments can be practiced without those specifically defined matters. Also, well-known functions or constructions are not described in detail since they would obscure the application with unnecessary detail.

Terms such as "first" and "second" may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure.

Furthermore, "and/or" may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

In the embodiments of the present disclosure, a "module" or "unit" performs at least one function or operation, and may be realized as hardware or software, or a combination thereof. Furthermore, a plurality of "modules" or a plurality of "units" may be integrated into at least one module and be realized as at least one processor (not illustrated) except for when they need to be realized as a certain hardware.

Herein below, the present disclosure will be explained in more detail with reference to the drawings attached.

Specifically, FIGS. 1 through 15, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram illustrating a configuration of a terminal apparatus according to an embodiment of the present disclosure.

Referring to FIG. 1, a terminal apparatus 100 is illustrated, where the terminal apparatus 100 may include a communication interface 110, a display unit 120, an input unit 130, a storage unit 140, a search unit 150, a setting unit 160, and a controller 170. The terminal apparatus 100 may be a smart phone, notebook, PMP, MP3 player, smart TV, wearable device (for example, a smart watch) and the like.

The communication interface 110 is configured to connect the terminal apparatus 100 to an external device (specifically, another terminal apparatus, and a cloud server). It may be connected to the external device through a local area network (LAN), the internet, or wireless communication methods (for example, Z-wave, internet protocol version 4 over low power wireless personal area networks (4LoWPAN), radio frequency identification (RFID), long term evolution (LTE) device-to-device (D2D), Bluetooth low energy (BLE), general packet radio service (GPRS), Weightless, Edge Zigbee, ANT+, near field communications (NFC), infrared data association (IrDA), digital enhanced cordless telecommunications (DECT), wireless local area network (WLAN), bluetooth (BT), wireless fidelity (Wi-Fi), Wi-Fi Direct, global system for mobile (GSM), universal mobile telecommunications system (UMTS), LTE, wireless broadband (WiBRO) and the like).

Furthermore, the communication interface 110 may communicate with the other terminal apparatus or a server. More specifically, the communication interface 110 may provide log information stored in the storage unit 140, that will be explained hereinafter, to the other terminal apparatus or the server, or receive log information stored in the other terminal apparatus or the server. Herein, the log information being received may be log information of the terminal apparatus 100 created in the terminal apparatus 100, or log information of the other terminal apparatus created in the other terminal apparatus.

The display unit 120 may display various types of information being supported by the terminal apparatus 100. Such a display unit 120 may be a monitor such as a liquid crystal display (LCD), a cathode ray tube (CRT), or a touch screen capable of also serving the functions of the input unit 130 that will be explained hereinafter.

Furthermore, the display unit 120 may display a list of applications installed in the terminal apparatus 100. Furthermore, the display unit 120 may display a screen being executed as an application is driven.

Furthermore, the display unit 120 may display a search screen for receiving input of a search word for searching for a content.

Furthermore, the display unit 120 may display a search result of the search unit 150 that will be explained hereinafter. More specifically, the display unit 120 may display information on a list of contents corresponding to the log information searched according to the searched result. For example, in a case where there are multiple searched contents, the searched contents may be displayed in a list format. Herein, the display unit 120 may display the content having the highest probability of being the content that the user was looking for at the top of the list.

The input unit 130 is equipped with a plurality of function keys through which the user may set or select various functions being supported by the terminal apparatus 100. The input unit 130 may be embodied as a device such as a mouse, keyboard, and microphone and the like, or as a touch screen configured to also serve the functions of the display unit 120 as aforementioned.

Furthermore, the input unit 130 may receive input of a command to drive an application. More specifically, the user may drive the application being provided by the terminal apparatus 100, and may receive various manipulation commands for operating the application. These manipulation commands input in such a process may be stored in the log information of the storage unit 140.

Furthermore, the input unit 130 may receive input of a search word for searching for a content. Herein, the search word may be a search word directly related to the content, or a search word related to the content in terms of time. The search word of the latter case may be related to a user action such as a telephone call counterpart, chatting counterpart, social networking service (SNS) keyword, location, a service provided in the terminal apparatus, and a service provided in another terminal apparatus and the like.

Furthermore, in a case of receiving input of a search word of the latter case, a type of the content intended to be searched may also be searched.

Furthermore, the input unit 130 may receive input of the type of the content to be searched. More specifically, the input unit 130 may receive input of the type of the content that the user intends to search together with the aforementioned search word.

Furthermore, the input unit 130 may receive time range information. More specifically, the input unit 130 may further receive time range information as a condition of the input search word.

Furthermore, the input unit 130 may receive input of a search word not only in a text format but also in a voice format. In such a case, the input unit 130 may recognize the input voice by itself, or transmit the input voice to another terminal apparatus or to a server and receive a voice recognition result from the other terminal apparatus or the server.

The storage unit 140 stores a program for driving the terminal apparatus 100. More specifically, the storage unit 140 may store a program, that is, a set of various commands necessary for driving the terminal apparatus 100. Herein, the program includes not only an application (or application program) for providing a certain service but also an operating program for driving the application.

Furthermore, the storage unit 140 stores log information of each application. Meanwhile, in a case where the terminal apparatus 100 is a personal computer (PC) or a smart television (TV) being used by a plurality of users, the storage unit 140 may store different log information for each user.

Herein, the log information may include a task performed in an application according to time (e.g., reproduction of a certain content, creation of a certain content, telephone call with a certain user, chatting with a certain user and the like), information on an event occurred in an application (receiving a telephone call from another user, alarm, GPS address information), and a text received from an application (search word input through a search site, SNS keyword and the like).

Furthermore, the storage unit 140 may store a plurality of log information in a graph format correlated in units of action/task/time. This will be explained in more detail later on with reference to FIG. 12.

Furthermore, the storage unit 140 may store a plurality of contents. Herein, a content may be a video file, memo file, sound source file, record file, web page, photograph file, document file, email, and e-book file and the like. Such a storage unit 140 may be embodied as a storage medium inside the terminal apparatus 100, or an external storage medium, such as a removable disk, and web server through a network and the like.

The search unit 150 may search a time range corresponding to a content that the user intends to search using an input search word and pre-stored log information. More specifically, the search unit 150 may search log information having a search word such as a telephone call counterpart, chatting counterpart, SNS keyword, location, service provided in the terminal apparatus, and service provided in another terminal apparatus, and extract time information of the corresponding log information. For example, in a case where the input search word is user A, the search unit 150 may extract log information having a user action such as telephone call/chatting/text messaging with user A, and extract a time point of the corresponding action.

Meanwhile, in a case of receiving input of range information through the input unit 130, the search unit 150 may perform a search using the input range information. For example, in a case where the input range is chatting, the search unit 150 may extract only the log information on the chatting action of the user actions corresponding to the input search word.

In addition, the search unit 150 may search log information corresponding to a content type within the searched time range. More specifically, the search unit 150 may search log information having time information within the searched time range and object information corresponding to the type of content input of among the pre-stored plurality of log information. For example, in a case where a time point of a former extraction is 10 am, the search unit 150 may search an application performed at 10 am based on the log information, and extract a content reproduced in the corresponding application as the search result.

The setting unit 160 may control the search unit 150 to search a time range within the input time range. More specifically, in a case of receiving input of range information through the input unit 130, the setting unit 160 may control the search unit 150 to perform a search within the input range information, when performing the aforementioned search. For example, in a case where the input range is this week, the setting unit 160 may control the search unit 150 to extract log information having only the user actions performed this week of among the user actions corresponding to the input search word.

The controller 170 controls each configuration of the terminal apparatus 100. More specifically, in a case of receiving input of a command to drive a certain application, the controller may drive a certain selected application, and control the display unit 120 to display a screen as the application is driven. Furthermore, the controller 170 may store a series of tasks and events performed during the processing of driving the application as log information. Herein, when a text is input through the certain application, the controller 170 may store the input text in the storage unit 140 as log information of the application.

Furthermore, the controller 170 may transmit the log information stored in the storage unit 140 to the other terminal apparatus or to the server. More specifically, the log information according to the present embodiment stores information on user actions, and thus has a greater capacity than general log information. Therefore, the controller 170 may transmit the generated log information to the other terminal apparatus or the server in a predetermined cycle.

In a case where such log information is transmitted to the other terminal apparatus or the server, when a search is necessary, the controller 170 may receive the log information stored in the other terminal apparatus or the server and use the received log information in the searching process. Furthermore, in an embodiment, the log information created in the other terminal apparatus may be received, and the controller 170 may control the search unit 150 to perform the search using the log information of the other terminal received. For example, in a case where the terminal apparatus is a tablet that does not support telephony, and the action performed by the user is an action such as a telephone call using a smart phone, that is another terminal apparatus, the controller 170 may control the communication interface 110 and search unit 150 to search for the content using the log information of the other terminal apparatus.

Furthermore, in response to receiving input of a command to search a content through the input unit 130, the controller 170 may control the search unit 150 to search a content corresponding to a keyword input. Furthermore, the controller 170 may control the display unit 120 to display a search result.

Furthermore, in response to receiving input of information on a search range through the input unit 130, the controller 170 may control the search unit 150 to perform a search within the search range received. For example, in response to the search range input being time information of this week, the search unit 150 may search a user action using only the log information performed this week. Hereinabove, it was explained that a search for a user action is made after a primary filtering of the log information, but in an embodiment, it is possible to search a user action corresponding to the keyword and then filter the search results to be within the search range input.

Meanwhile, in response to receiving input of a request to provide log information from the other terminal apparatus, the controller 170 may control the communication interface 110 to provide pre-stored log information to the other terminal apparatus. Herein, the controller 170 may control the communication interface 110 to provide all the log information stored to the other terminal apparatus or to provide only the log information corresponding to a provision request to the other terminal apparatus. For example, in response to the another terminal apparatus requesting log information for a period such as today, or this week, the controller 170 may provide only the log information corresponding to those periods to the other terminal apparatus.

As aforementioned, the terminal apparatus according to the embodiment may search a content not only using a directly related title, storage place and keyword but also using a user action related to the content in terms of time, thereby improving user convenience.

Meanwhile, in explaining FIG. 1, it was explained that the search unit 150, the setting unit 160, and the controller 170 were configured separately, but in an embodiment, it is possible to integrate the functions of the search unit 150, the functions of the setting unit 160, and the functions of the controller 170 into one configuration.

Meanwhile, in explaining FIG. 1, it was explained that the terminal apparatus 100 performs a search when a search word is input through the input unit 130, that is, it was explained that the terminal apparatus 100 supports only manual searching. However, a search operation may be performed even when a user did not input a certain search word. For example, if the user has been watching a movie while making a telephone call, once the telephone phone with the user ends, the terminal apparatus 100 may automatically provide the user with the movie content that the user has been watching during the previous telephone call. That is, the terminal apparatus 100 may perform a search operation using the task currently being performed as the search word.

Meanwhile, in explaining FIG. 1, it was explained that the terminal apparatus 100 stores only the log information of its own, but the terminal apparatus 100 may also receive log information created in another terminal apparatus 100, and combine the received log information and the log information of its own, and use the same. Herein, instead of one apparatus having an integrated piece of log information, a plurality of terminal apparatuses may each have a same piece of log information. That is, the log information created in each terminal apparatus may be mutually shared.

Furthermore, in explaining FIG. 1, it was explained that the terminal apparatus 100 creates log information and then performs all the operations of searching the created log information, but in an embodiment, it is possible to configure the terminal apparatus 100 such that creating log information and searching the created log information are performed in separate apparatuses. For example, log information may be created in the terminal apparatus 100 and then transmitted to the server, whereas searching for a content is performed at the server side.

Furthermore, in explaining FIG. 1, it was explained that the terminal apparatus 100 searches a content based on a certain action, but on the contrary to this, in an embodiment, it is possible to search an action based on a content, and search another a second content based on a first content, or search a second action based on a first action.

Furthermore, hereinabove, the term "action" was used for the sake of ease of explanation, but in the perspective of a machine and not a user, the term "action" may be substituted to "task."

Furthermore, in explaining FIG. 1, only the operation of searching a certain content using a prestored piece of log information was explained, but the log information may be used when lock releasing the terminal apparatus. This will be explained in more detail with reference to FIGS. 13 and 15 later on.

FIGS. 2 to 11 are views illustrating various examples of searching for a content according to various embodiments of the present disclosure.

Figure 2:
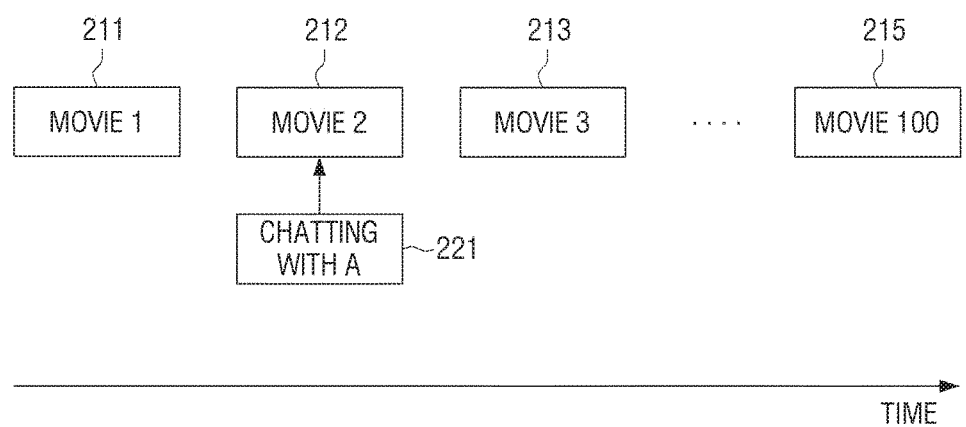
FIG. 2 is a view illustrating searching for a video content according to an embodiment of the present disclosure.

Specifically, FIG. 2 is a view illustrating searching for a video content according to an embodiment of the present disclosure.

Referring to FIG. 2, an embodiment is illustrated of an example of searching for a content in a case where a user has watched 100 video files (e.g., movie 1, 211, movie 2, 212, movie 3, 213 . . . movie 100, 215) in 1 month and now wants to find a certain video file of the 100 video files but cannot remember the title of the certain video file.

Normally when a user cannot remember the title of a movie, the user may remember an actor/actress who starred in that move, and find the video file by searching the title of the movie based on the actor/actress. However, if the name of the file is different from the title of the movie, or if the video file is a record of the user's daily lives and so the video file doesn't have a meaningful file name, the user has no choice but to check all the stored video files one by one in order to find the video file.

If the user has been doing an online chatting with a friend A 221 while watching the video content 212 (e.g., movie 2), and the user remembered that he/she has been chatting with friend A, then the user may search the certain content based on that action.

More specifically, the user may input a search word: "friend A+video" into the terminal apparatus 100, as illustrated in FIG. 1. Then, in response to receiving input of such a search word, the terminal apparatus 100 may search log information that includes friend A, and check the point of chatting with friend A from the searched log information.

When such a point of chatting is confirmed as aforementioned, using another piece of log information performed at the action point confirmed, the terminal apparatus 100 may search and confirm that the video content that the user is looking for is movie 2, 212.

Meanwhile, if the user has been chatting online or having telephone calls with friend A very often, a plurality of search results may come up. In this case, the user may add a search word to further limit the search range. For example, it is possible to add "chatting" as a search word so as to exclude telephone calls with friend A, and search video contents corresponding to time points of chatting with friend A. Otherwise, it is possible to add "this week" as a search word, and search a video content corresponding to periods of telephone calls made this week of among time points of the chatting and telephone calls with friend A FIG. 3 is a view illustrating searching for a memo content according to an embodiment of the present disclosure.

Figure 3:
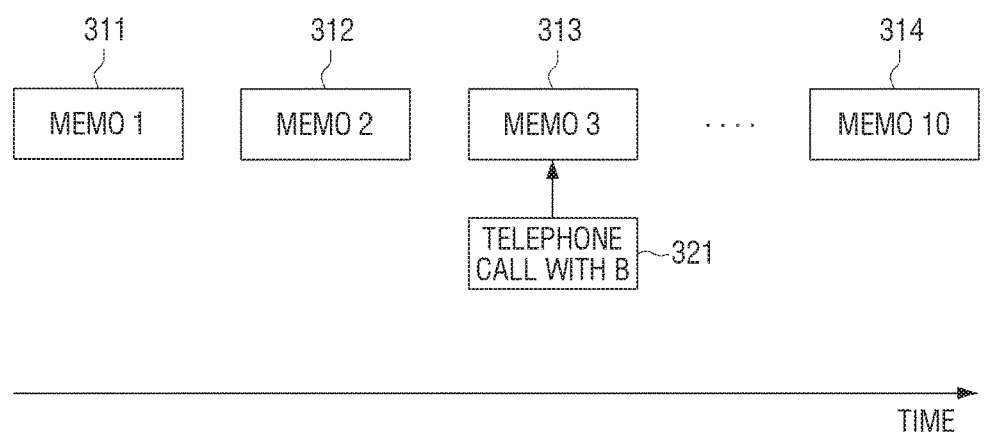
FIG. 3 is a view illustrating searching for a memo content according to an embodiment of the present disclosure.

Referring to FIG. 3, an embodiment is illustrated of an example of searching for a memo, when a user has made 10 memos for the day (e.g., memo 1, 311, memo 2, 312, memo 3, 313 . . . memo 10, 314), and the user wants to find one of the memos, but cannot remember the title or theme of the memo.

People often make memos of what they have to do not to forget about them. But sometimes they only remember the acts of making the memos and forget what they were about. In such a case, people had no choice but to go through all the memos to find the one that they were looking for. However, if there were about hundreds of memos written over several weeks or months, not ten memos as in FIG. 3, going through all the memos is not an easy thing to do.

In such a case, if the user has received a telephone call from friend B when writing the memo, and the user remembered such action of the telephone call, the user may search the memo based on the action of telephone call.

More specifically, the user may input a search word "friend B+memo" into the terminal apparatus 100, as illustrated in FIG. 1. In response to receiving such a search word, the terminal apparatus 100 may search log information having friend B, and check the time point of the telephone call 321 with friend B from the searched log information. Then, by searching the action of the memo written at the time point of the telephone call, the terminal apparatus 100 may find the memo 313 that he/she has been looking for.

Meanwhile, hereinabove, explanation was made on an embodiment of searching for a content based on a case where two actions have been performed at one time point. However, the two actions do not have to be performed at the same time. They may be distanced from each other by a certain interval.

For example, even if the time point of the telephone call with friend B came after the user completed writing the memo 3, 313, the user may remember the telephone call with friend B made after completing writing the memo. In such a case, even if it does not coincide with the checked time point of the telephone call, the terminal apparatus 100 may search the action of the "memo" in a certain time range, and find the memo 313 that he/she was looking for. A range of such a time point may be embodied to have a default value, or to be adjustable by the user. Meanwhile, in an embodiment, it is possible to take such a time difference into account when storing log information instead of when making a search. That is, when linking two pieces of log information, instead of linking two pieces of log information performed at a same time point, it is also possible to link multiple log information performed sequentially within a predetermined time frame.

Figure 4:
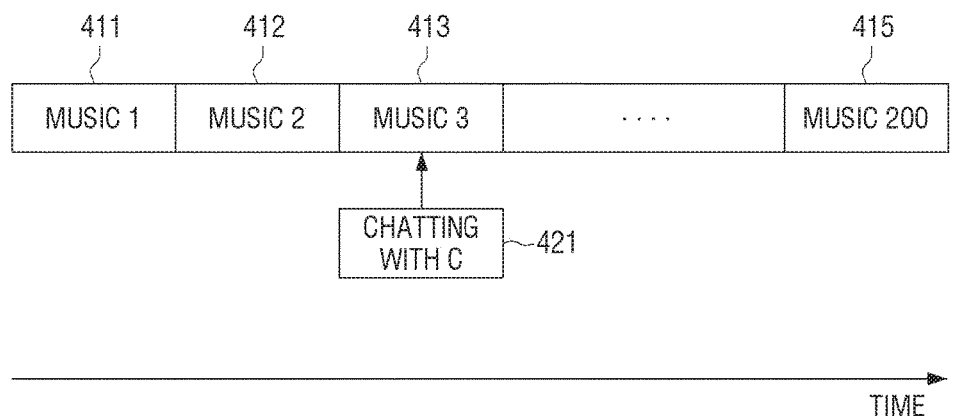
FIG. 4 is a view illustrating searching for a sound source content according to an embodiment of the present disclosure.

FIG. 4 is a view illustrating searching for a sound source content according to an embodiment of the present disclosure.

Referring to FIG. 4, an embodiment is illustrated of an example of a case where a user has listened to 200 pieces of music for the day (e.g., music 1, 411, music 2, 412, music 3, 413 . . . music 200, 415) and wants to find one of them, but cannot remember the singer or title of the song.

Usually, a sound source file has the song title or song title+singer as its file name, or has information such as song title, singer, name of album and the like as tag information. Therefore, for the user to find a sound source, he/she has to know the song title, singer, album and so forth.

However, in conventional techniques, if the user doesn't known any of those, then the user has to listen to all the sound sources to find the right one.

These day, streaming methods are often used to reproduce music contents, but listening to hundreds of songs sequentially all over again to find a certain sound source is not easy.

In such a case, if the user remembered that while listening to music 413, he/she has been online chatting with friend C and said that that music was really good while, the user may search the certain music based on that action of online chatting.

More specifically, the user may input a search word: "friend C+music" into the terminal apparatus 100, as illustrated in FIG. 1. In response to receiving such a search word, the terminal apparatus 100 may search log information that includes friend C, and check the time point of online chatting with friend C. Furthermore, the terminal apparatus 100 may search the action of listening to music while doing online chatting with friend C 421 and find the music file that he/she was looking for.

Meanwhile, there may be a lot of music files if the user has been online chatting with friend C for a long time.

In such a case, the user may add a part of the text used during the chatting as a keyword for the search word. For example, the user may input a keyword "friend C+music+good" into the terminal apparatus 100. Herein, the terminal apparatus may search the time point where he/she had input the text "good" during the online chatting with friend C and find the music that he/she was looking for.

Figure 5:
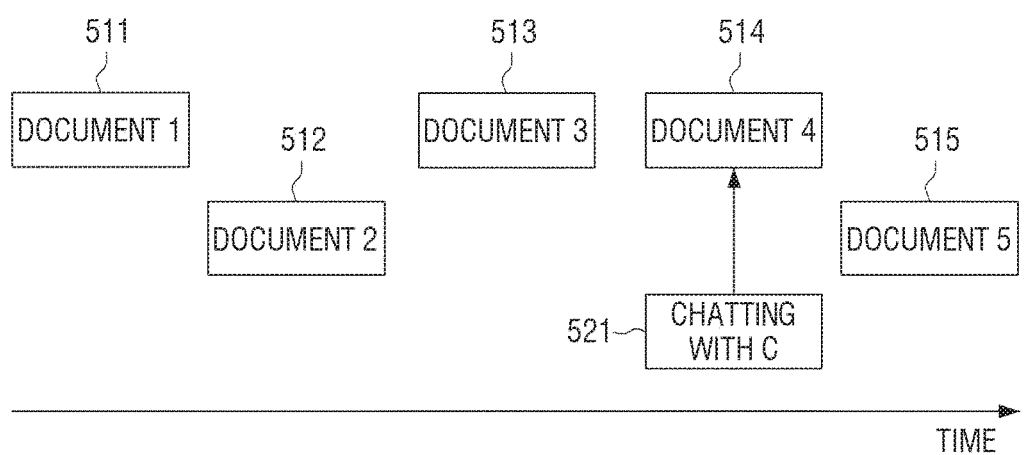
FIG. 5 is a view illustrating searching for a document content according to an embodiment of the present disclosure.

FIG. 5 is a view illustrating searching for a document content according to an embodiment of the present disclosure.

Referring to FIG. 5, an embodiment is illustrated of an example of a case where a user has written 5 documents for the day (e.g., document 1, 511, document 2, 512, document 3, 513, document 4, 514 and document 5, 515) and wants to find one of them but cannot remember the file name stored.

A file name of a document is usually made randomly by the user, but file names usually have something to do with the documents. Therefore, unlike other types of contents, it may not be difficult to find a certain document. However, if the user has been writing 5 documents at the same time and a blackout occurred, all the documents would have been stored as temporary files without having certain names. Therefore, hundreds of temporary files are stored in the folder for storing temporary files, which makes it difficult to find a certain temporary file.

However, if the user had remembered doing online chatting with a boss C 521 asking a question about the certain document while writing the document, the user may search the certain document based on the that action of online chatting.

More specifically, the user may input a search word: "boss C+document" into the terminal apparatus 100, as recited in FIG. 1. In response to receiving such a search word, the terminal apparatus 100 may search log information that includes boss C, and check the time point of online chatting with boss C 521 from the searched log information.

Furthermore, the terminal apparatus 100 may search a document where a text has been input at the checked time point of the online chatting or near the checked time point of the online chatting, and find the certain document.

Meanwhile, if the user has been writing the document with other documents opened up at the same time, it may be difficult to find the exact document. Herein, the user may specify the type of the document using a search word so as to find the document more precisely. For example, if the document that the user is looking for is a PDF file, the user may input a search word: "boss C+document+PDF" into the terminal apparatus 100. In response to receiving such a search word, the terminal apparatus 100 may search a PDF file opened at the time point of online chatting with boss C.

Figure 6:
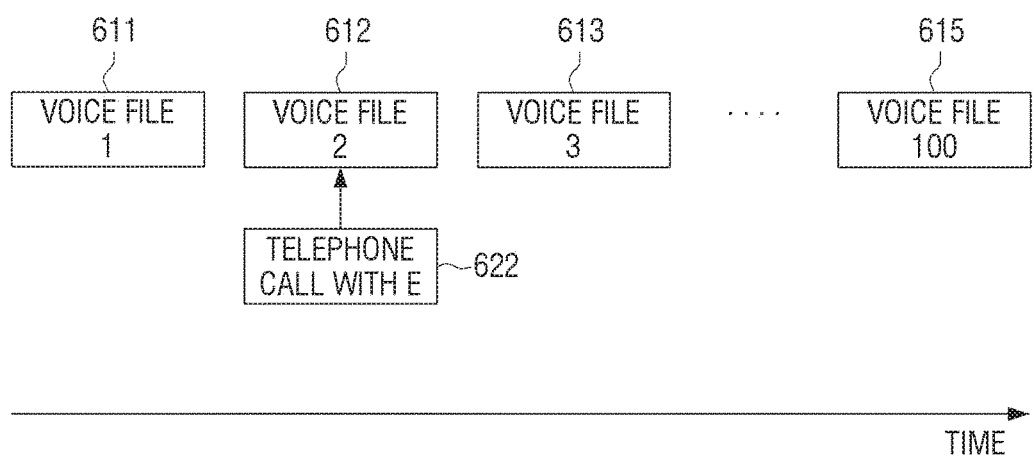
FIG. 6 is a view illustrating searching for a record file according to an embodiment of the present disclosure.

FIG. 6 is a view illustrating searching for a record file according to an embodiment of the present disclosure.

Referring to FIG. 6, a search example of a case where the user created 100 voice files for that month (e.g., voice file 1, 611, voice file 2, 612, voice file 3, 613 . . . voice file 100, 615) and wants to find one of them, but cannot remember the title of the voice file or the time point where the voice file was created.

A file name of a voice file usually includes only the information on when the voice file was created. Thus, it is a kind of file that cannot be searched easily if the user doesn't know when it was created.

In such a case, if the user had received a telephone call from a friend E 622 in the middle of creating a certain voice file, and the user remembered doing that, he/she may search the voice file based on that action of the telephone call.

More specifically, the user may input a search word: "friend E+record" into the terminal apparatus 100. In response to receiving such a search word, the terminal apparatus 100 may search log information that has friend E, and check a time point of the telephone call with friend E 622 from the searched log information. Furthermore, the terminal apparatus 100 may search the action of recording performed at the checked time point of the telephone call, and find the voice file 612 that he/she was looking for.

Figure 7:
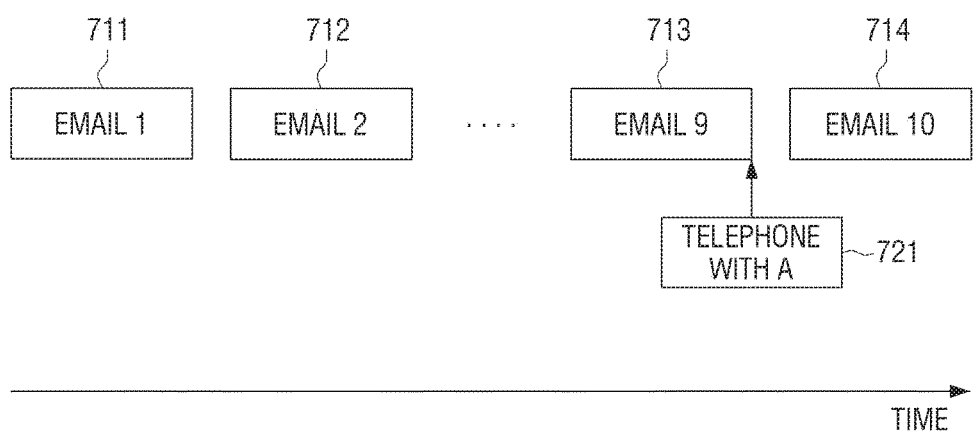
FIG. 7 is a view illustrating searching for an email according to an embodiment of the present disclosure.

FIG. 7 is a view illustrating searching for an e-mail according to an embodiment of the present disclosure.

Referring to FIG. 7, an embodiment is illustrated of an example of a case where a user has transmitted an email a few months before (e.g., email 1, 711, email 2, 712 . . . email 9, 713 and email 10, 714) and now wants to find that email, but cannot remember to which email address that email has been sent to nor the exact time point of sending the email.

However, if the user, after sending the email, had made a telephone call to friend A 721 that he/she had sent an email, the user may search the email that he/she was looking for using a search word "friend A+email."

Meanwhile, emails are usually stored in a server instead of a terminal apparatus. In such a case, the terminal apparatus 100, as illustrated in FIG. 1, may request the server for log information corresponding to an action of sending an email and receive the requested log information, and then search the email that he/she was looking for using that log information received from the server together with log information related to the action of the telephone call stored in the terminal apparatus 100.

Figure 8:
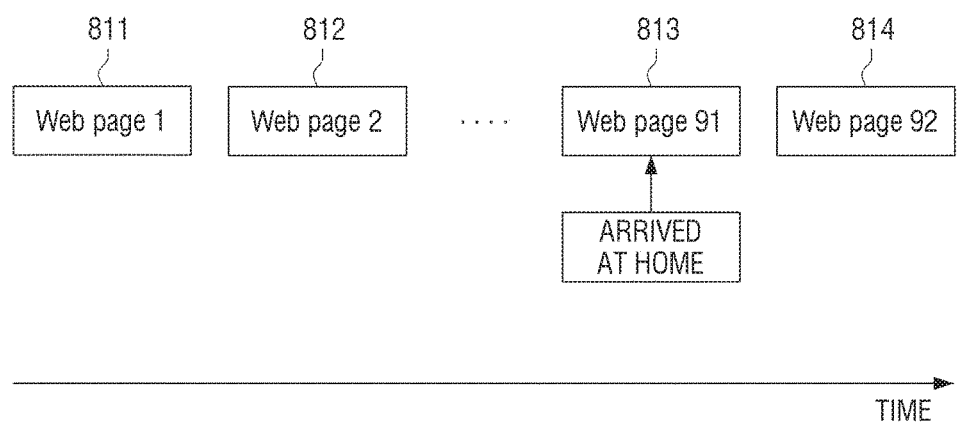
FIG. 8 is a view illustrating searching for a certain web page according to an embodiment of the present disclosure.

FIG. 8 is a view illustrating searching for a certain web page according to an embodiment of the present disclosure.

Referring to FIG. 8, an embodiment is illustrated of an example of a case where a user has seen 100 web pages for the day (e.g., web page 1, 811, web page 2, 812 . . . web page 91, 813 and web page 92, 814) and wants to find one of the web pages but cannot remember the exact address of the web page.

However, if the user remembered that he/she had arrived at home while watching the web page, the user may input a search word: "home+web page" into the terminal apparatus 100. In response to receiving such a search word, the terminal apparatus 100 may search a time point where the user arrived at home using log information on GPS or location-based application, and search log information that includes the action of watching the web page of the log information searched. Furthermore, the terminal apparatus 100 may provide the user with web page information within the searched log information.

Figure 9:
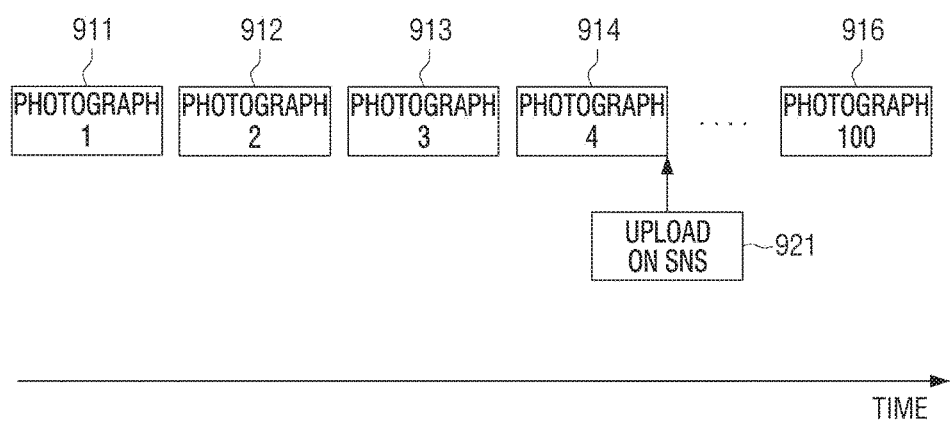
FIG. 9 is a view illustrating searching for a photograph content according to an embodiment of the present disclosure.

FIG. 9 is a view illustrating searching for a photograph content according to an embodiment of the present disclosure.

Referring to FIG. 9, an embodiment is illustrated of an example of a case where a user has photographed 100 pictures (e.g., photograph 1, 911, photograph 2, 912, photograph 3, 913, photograph 4, 914 . . . photograph 100, 916) and wants to search for one of the pictures.

A photograph usually has only meta data related to the picture photographed, and thus if the user doesn't know the location or time where the picture was photographed, it is not easy to find the photograph with only a search word.

However, if the user remembers posting the picture on SNS with a certain keyword after photographing the picture, the user may search the picture based on the action of uploading on SNS 921.

More specifically, the user may input a search word: "SNS+photograph" into the terminal apparatus 100, as illustrated in FIG. 1. In such a case, the terminal apparatus 100 may search for photograph 4, 914 photographed right before the action of uploading on SNS.

Figure 10:
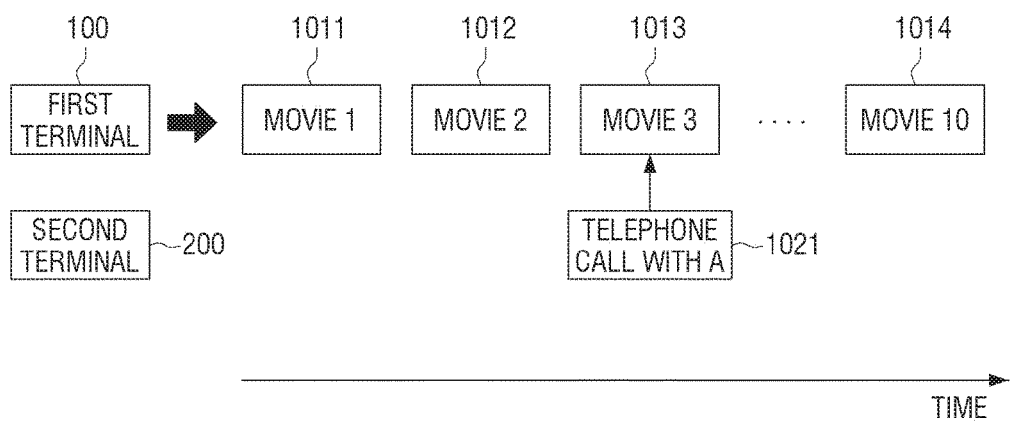
FIG. 10 is a view illustrating searching for a content using log information of another terminal apparatus according to an embodiment of the present disclosure.

FIG. 10 is a view illustrating searching for a content using log information of another terminal apparatus according to an embodiment of the present disclosure.

Referring to FIG. 10, an embodiment is illustrated of an example of a case where a user has seen 10 video files (e.g., movie 1, 1011, movie 2, 1012, movie 3, 1013 . . . movie 10, 1014) for one week, and wants to find a certain video file, but cannot remember the title of the video file.

If the user had made a telephone call with a friend A 1021 using another terminal apparatus at the time point of watching the video content 1013, and remembered that he/she had made a telephone call with friend A, the user may search the certain content based on the that action.

More specifically, the user may input a search word: "friend A+video" into a terminal apparatus 100 (e.g., a first terminal). Meanwhile, since the action of the telephone call has been made in another terminal apparatus 200 (e.g., a second terminal), the terminal apparatus 100 may request the other terminal apparatus 200 for log information and receive the log information, and search log information that includes friend A based on the log information of the another terminal apparatus 200 received and log information pre-stored in the terminal apparatus, and then check the time point of the telephone call with friend A from the searched log information.

Furthermore, the terminal apparatus 100 may search that the video content is a movie 3, 1013, that the user was looking for using the another log information performed at checked time point of the action.

Meanwhile, receiving of the log information of the other terminal apparatus 200 as aforementioned may be performed at the point the user's search was requested, or when log information of friend A is not searched from the log information stored in the terminal apparatus 100. Otherwise, the receiving of the log information of the other terminal apparatus 200 may be performed by the terminal apparatus 100 and the other terminal apparatus 200 sharing the log information at a predetermined cycle.

Figure 11:
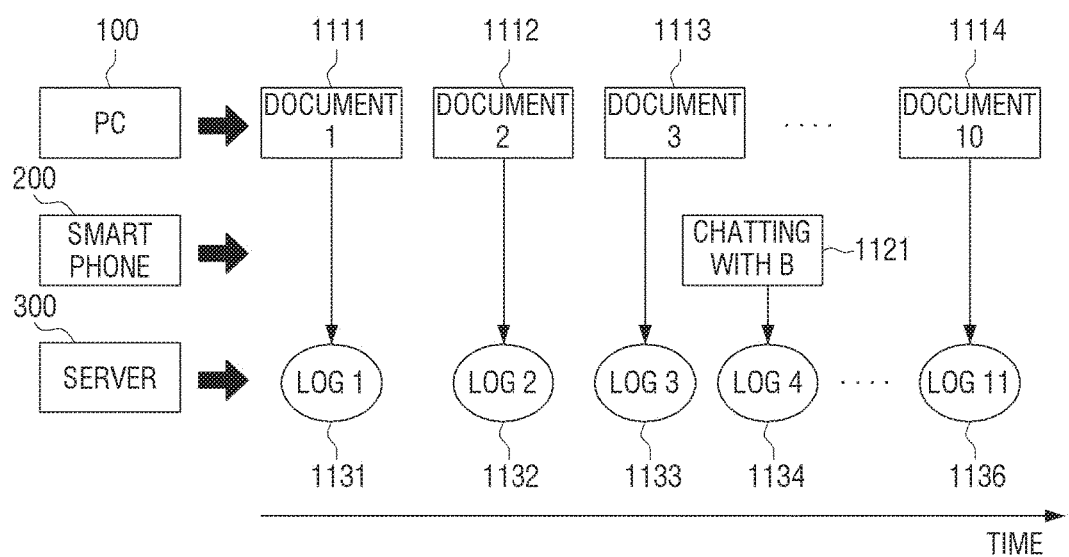
FIG. 11 is a view illustrating searching for a content using log information transmitted to a server according to an embodiment of the present disclosure.

FIG. 11 is a view illustrating searching for a content using log information transmitted to the server according to an embodiment of the present disclosure.

Referring to FIG. 11, an embodiment is illustrated of an example of a case where a user has written 10 documents for the day (e.g., document 1, 1111, document 2, 1112, document 3, 1113 . . . document 10, 1114), and wants to find one of them, but cannot remember where the document file is stored.

However, if the user had chatted on a smart phone with friend B 1121 while writing the certain document and remembered that he/she had chatted with friend B, the user may search the certain content based on the action of such chatting.

More specifically, the user may input a search word: "friend B+document" into the terminal apparatus 100 (e.g., a PC) as illustrated in FIG. 1. Meanwhile, log information of terminal apparatus 100 and terminal apparatus 200 (e.g., a smart phone) that the user used is stored in a server 300. Specifically, log 1, 1131 corresponding to document 1, 1111, log 2, 1132 corresponding to document 2, 1112, log 3, 1133 corresponding to document 3, 1113, log 4, 1134 corresponding to the chat with B 1121 and log 11, 1136 corresponding to document 10, 1114 are stored in the server 300. Accordingly, the terminal apparatus 100 may receive the log information from the server 300 and search the document that he/she was looking for.

Meanwhile, in an embodiment, the terminal apparatus 100 may transmit the search word input by the user to the server 300, and search the document that he/she is looking for using the search word received from the server 300. Furthermore, the search result may be provided to the terminal apparatus 100, and the final search result may be provided on the terminal apparatus 100.

Figure 12:
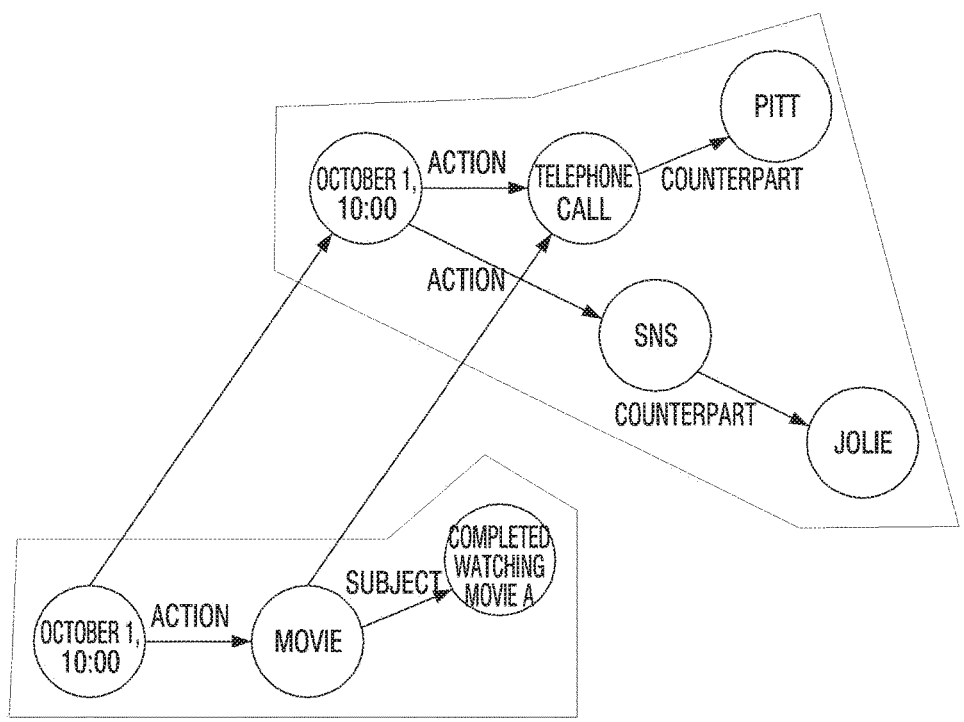
FIG. 12 is a view illustrating an example of log information stored in a storage according to an embodiment of the present disclosure.

FIG. 12 is a view illustrating an example of log information stored in a storage according to an embodiment of the present disclosure.

In order to perform a search as aforementioned, log information that has is based on user's actions must be pre-stored. Such log information may be configured in an ontology format. Herein, the ontology defines a meaningful relationship between objects in the real world, thereby providing an explicit specification capable of processing knowledge information with a computer. This structure is illustrated in FIG. 12, where times, types of communications, actions, subject and individuals are identified and linked together.

As methods for expressing such ontology, graph-based expression languages such as resource description framework (RDF), RDF scheme (RDFS) and web ontology language (OWL) are well known. These ontology languages express objects or concepts of objects, and types of the attributes of the objects as vertexes, and relationships between the object and attributes of the objects as edges.

Referring to FIG. 12, time, a task (or content) performed in an application, a telephone counterpart, and a chatting counterpart of the log information may be expressed as vertexes, and the attributes of the objects may be expressed as edges.

Meanwhile, hereinabove, only examples of searching a certain content using pre-stored log information was explained, but the log information may be used in using the lock release of the terminal apparatus 100.

Figure 13:
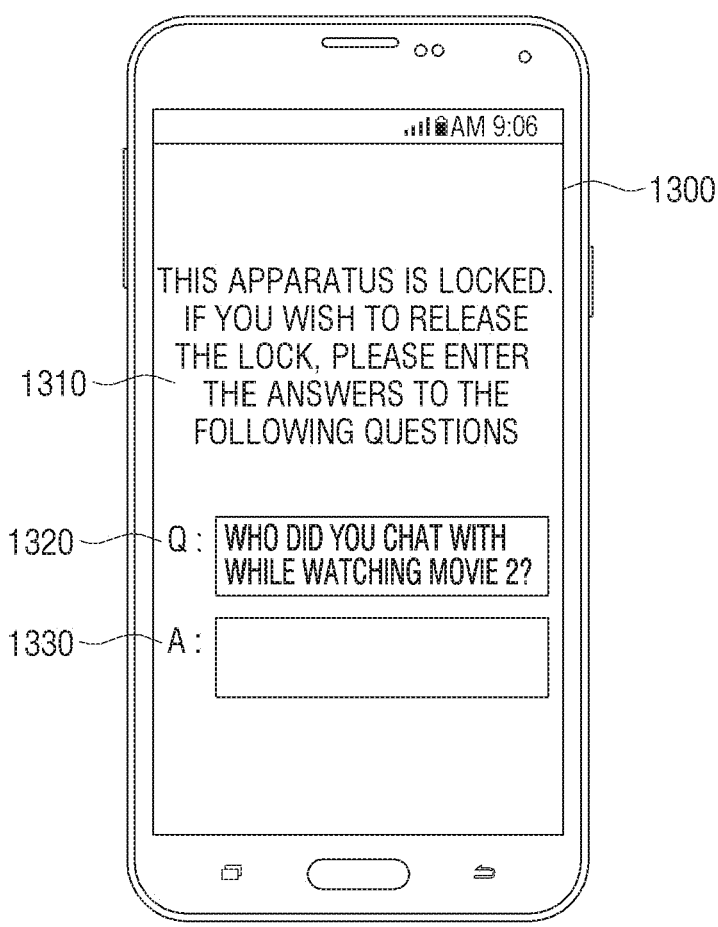
FIG. 13 is a view illustrating an example of a user interface window that may be displayed on a display unit of FIG. 1 according to an embodiment of the present disclosure.

FIG. 13 is a view illustrating an example of a user interface window that may be displayed on a display unit according to an embodiment of the present disclosure.

Referring to FIG. 13, a user terminal window 1300 is illustrated, where the user terminal window 1300 may include a guide message area 1310, a question area 1320, and an answer area 1320.

The guide message area 1310 is an area that displays that the terminal apparatus is locked and thus there are ways to release the lock.

The question area 1320 is an area that displays questions for releasing the lock using the pre-stored log information. For example, in a case where log information such as in FIG. 2 is pre-stored, the question area 1320 may display a question asking who was the person the user was chatting to while watching movie 2. If the user inputs "A" into the answer area 1320 in response to that question, the lock of the terminal apparatus will be released. However, if the user inputs a person other than "A," the question area 1320 may display a message for inputting another keyword, or another question according to another log information.

The answer area 1330 is an area for receiving an answer corresponding to the question area 1320. If a keyword received through the answer area 1330 is an answer corresponding to a question stated in the question area 1320, the controller 170 may release the state of lock of the terminal apparatus 100. Furthermore, the displayer 120 may display a screen for selecting an application.

Figure 14:
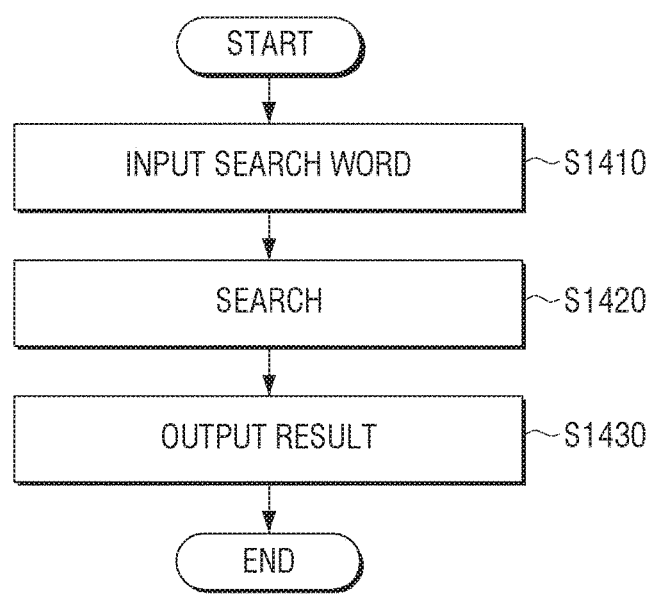
FIG. 14 is a view illustrating a content searching method according to an embodiment of the present disclosure.

FIG. 14 is a view illustrating a content searching method according to an embodiment of the present disclosure.

Referring to FIG. 14, a content searching method is illustrated, where a type of content intended to be searched and a keyword related to the content in terms of time are input at operation S1410. More specifically, the type of the content to be searched and the keyword related to the user's action related to viewing of the content or the point creation of the content may be received. Herein, the content may be a video file, memo file, sound source file, record file, web page, photograph file, document file, or email. Furthermore, the keyword may be a telephone counterpart, chatting counterpart, SNS keyword, location, service provided in the terminal apparatus, service provided in another terminal apparatus and the like related to the user's action.

Furthermore, using the input keyword and pre-stored log information, a time range corresponding to the content may be searched, and the log information corresponding to the type of content within the searched time range may be searched at operation S1420. More specifically, based on the input keyword, the log information corresponding to the search word may be searched, and time information may be extracted from the searched log information. Furthermore, based on the extracted time information and the type of the content, log information may be re-searched.

Furthermore, the searched log information is displayed at operation S1430. More specifically, the log information searched in the previous process or the content corresponding to the log information may be displayed. Hereinabove, it was explained that the search result is displayed, but in an embodiment, the search result may be output as voice or may be transmitted to another terminal apparatus.

The aforementioned method for searching for a content according to the embodiment may perform a search operation of a content using a user action related to the content in terms of time even when the user cannot remember the title, place, and keyword and the like directly related to the content. The control method as in FIG. 14 may be executed in the terminal apparatus having the configuration of FIG. 1, and also in other terminal apparatuses having other types of configuration.

Furthermore, the aforementioned control method may be embodied in a program such as an application that includes an algorithm that executable in a computer, or in a platform such as an operating system, the program being stored in a non-transitory computer-readable storage medium.

A non-transitory computer-readable storage medium is a medium that stores data permanently or semi-permanently, not for a short period of time such as a register, cache, and memory, and that can be read by a device. More specifically, the aforementioned various applications or programs may be stored in a non-transitory computer readable medium such as a compact disk (CD), digital versatile disk (DVD), hard disk, blue ray disk, universal serial bus (USB), memory, and read only memory (ROM) and the like, and be provided.

Figure 15:
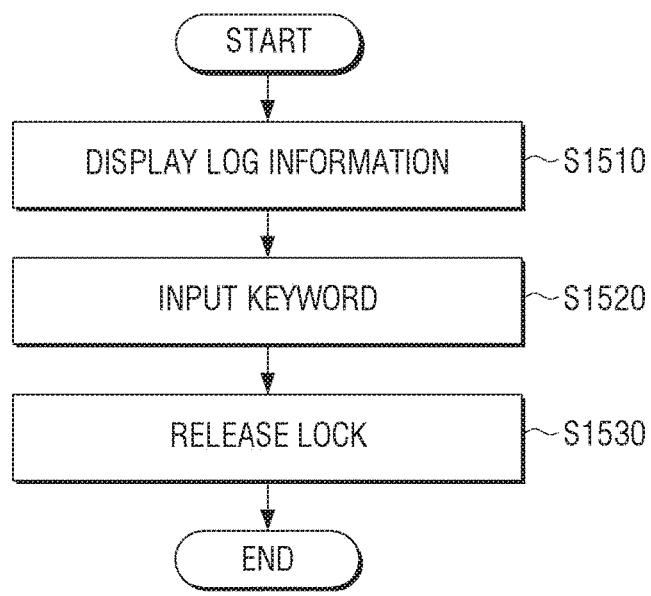
FIG. 15 is a view illustrating a method for lock releasing of a terminal apparatus according to an embodiment of the present disclosure.

FIG. 15 is a view illustrating a method for lock releasing of a terminal apparatus according to an embodiment of the present disclosure.

Referring to FIG. 15, a method for lock releasing of a terminal apparatus is illustrated, where a question corresponding to log information is displayed at operation S1510. More specifically, when the displayer is turned on with the terminal apparatus 100, as illustrated in FIG. 1, in a locked state, a user interface window for receiving the question corresponding to the log information and an answer to the question may be displayed.

Then, a keyword is input at operation S1520. More specifically, the keyword that corresponds to the question may be input in the answer area in the user interface window.

Furthermore, comparison is made whether or not the keyword that the user input corresponds to the question, and depending on the comparison result, the lock of the terminal apparatus 100 may be released at operation S1530. If the keyword that the user input does not correspond to the question, a message may be displayed to input another keyword, or another question according to another log information may be displayed.

The aforementioned method for lock releasing the terminal apparatus according to the present embodiment may release the lock based on log information according to user's experience, and thus it will be difficult for other users to release the lock. Furthermore, the log information to be used for every lock release will change due to updates on the log information, thereby improving security. The lock release method as in FIG. 15 may be executed on a terminal apparatus having a configuration as FIG. 1, or on other types of terminal apparatuses having other configurations.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and the scope of the present disclosure as defined by the appended claims and their equivalents.

What is claimed is:

1. A terminal apparatus comprising:
an input interface configured to receive an input of a search word other than direct information of a content to be searched for;
at least one hardware processor configured to:
search log information having the input search word using the input search word and pre-stored log information,
search for a time range including time information extracted from the log information having the input search word, and
search for log information corresponding to the content within the searched time range; and
a display configured to display information regarding a list of contents corresponding to the searched log information,
wherein the at least one hardware processor of the terminal apparatus is further configured to change the log information used for every lock release due to updates on the log information.

2. The terminal apparatus according to claim 1,
wherein the input interface is further configured to receive an input of a type of the content to be searched, and
wherein the at least one hardware processor is further configured to search for log information corresponding to the type of the content within the searched time range.

3. The terminal apparatus according to claim 1, wherein the search word is related to the content to be searched for in terms of time.

4. The terminal apparatus according to claim 1, further comprising a memory configured to store the log information,
wherein the log information comprises a plurality of applications including a user action for each application of the plurality of applications according to time.

5. The terminal apparatus according to claim 4, wherein the log information is at least one of a task performed for each application of the plurality of applications according to time information and event information.

6. The terminal apparatus according to claim 5, wherein the task performed for each application includes at least one of a reproduction of a certain content, a creation of a certain content, a telephone call with a certain user, or chatting with the certain user.

7. The terminal apparatus according to claim 4, wherein the memory is further configured to store elements that configure the log information in a graph format.

8. The terminal apparatus according to claim 4, further comprising a controller configured to:
extract a text input through an application of the plurality of applications; and
store the extracted text in the memory as log information regarding the application.

9. The terminal apparatus according to claim 1, further comprising a communication interface configured to transmit the stored log information to one of another terminal apparatus or a server.

10. The terminal apparatus according to claim 1, further comprising a communication interface configured to receive the log information stored in another terminal apparatus and a server,
wherein the at least one hardware processor is further configured to search for the log information within the searched time range based on the pre-stored log information and the received log information.

11. The terminal apparatus according to claim 1, wherein a type of the content is at least one of a video file, a memo file, a sound source file, a record file, a web page, a photograph file, a document file, or an email.

12. The terminal apparatus according to claim 1, wherein the search word is at least one of a telephone call counterpart, a chatting counterpart, a social networking service (SNS) keyword, a location, a service provided in the terminal apparatus, or a service provided in another terminal apparatus.

13. The terminal apparatus according to claim 1,
wherein the input interface is further configured to receive an input of time range information, and
wherein the at least one hardware processor is further configured to search for a time range within the input time range information.

14. A method for searching for contents on a terminal apparatus, the method comprising:
receiving, by an input interface of the terminal apparatus, an input of a keyword other than direct information of a content to be searched;
searching log information having the input keyword using the input keyword and pre-stored log information;
searching for a time range including time information extracted from the log information having the input keyword;
searching for log information corresponding to the content within the searched time range; and
displaying information regarding a list of contents corresponding to the searched log information,
wherein the terminal apparatus changes the log information used for every lock release due to updates on the log information.

15. The method according to claim 14,
wherein the receiving of the input of the keyword includes receiving an input of a type of the content to be searched, and
wherein the searching for the time range includes searching for log information corresponding to the type of the content within the searched time range.

16. The method according to claim 14, further comprising storing a plurality of applications and a user action for each application of the plurality of applications as log information according to time.

17. The method according to claim 14, further comprising transmitting the pre-stored log information to one of another terminal apparatus or a server.

18. The method according to claim 14, further comprising receiving log information stored in another terminal apparatus and a server,
wherein the searching for the time range includes searching for log information corresponding to a type of the content within the searched time range based on the pre-stored log information and the received log information.

19. The method according to claim 14,
wherein the receiving of the input of the keyword includes receiving an input of time range information, and wherein the searching for the time range includes searching for the time range within the input time range information.

20. A non-transitory computer-readable recording medium storing instructions that, when executed, cause at least one processor to perform a method for searching for contents on a terminal apparatus, the method comprising:

receiving, by an input interface of the terminal apparatus, an input of a keyword other than direct information of a content to be searched;

searching log information having the input keyword using the input keyword and pre-stored log information;

searching for a time range including time information extracted from the log information having the input keyword;

searching for log information corresponding to the content within the searched time range; and displaying information regarding a list of contents corresponding to the searched log information, wherein the terminal apparatus changes the log information used for every lock release due to updates on the log information.

\* \* \* \* \*